(12) United States Patent
Liu (10) Patent No.: US 11,493,022 B2
(45) Date of Patent: Nov. 8, 2022

(54) VERTICAL AXIS WIND-POWERED GENERATOR USING GUIDED CARTS

(71) Applicant: Guang Rong Liu, Richmond (CA)

(72) Inventor: Guang Rong Liu, Richmond (CA)

(*) Notice: Subject to any disclaimer, the term of this patent is extended or adjusted under 35 U.S.C. 154(b) by 1 day.

(21) Appl. No.: 17/264,605

(22) PCT Filed: May 10, 2019

(86) PCT No.: PCT/CA2019/050633
§ 371 (c)(1),
(2) Date: Jan. 29, 2021

(87) PCT Pub. No.: WO2020/227800
PCT Pub. Date: Nov. 19, 2020

(65) Prior Publication Data
US 2021/0293219 A1 Sep. 23, 2021

(51) Int. Cl.
*F03D 5/04* (2006.01)
*F03D 15/00* (2016.01)

(52) U.S. Cl.
CPC ............... *F03D 5/04* (2013.01); *F03D 15/00* (2016.05); *F05B 2220/706* (2013.01)

(58) Field of Classification Search
CPC ...... F03D 5/04; F03D 15/00; F05B 2220/706; F03B 7/006; F03B 9/00; F03B 9/005
See application file for complete search history.

(56) References Cited

U.S. PATENT DOCUMENTS

| | | |
|---|---|---|
| 1,791,731 A | 2/1931 | Madarasz |
| 3,504,988 A | 4/1970 | Stenner |
| 4,302,684 A | 11/1981 | Gogins |
| 4,589,344 A | 5/1986 | Davison |
| 4,859,146 A | 8/1989 | Labrador |
| 5,758,911 A | 6/1998 | Gerhardt |
| 6,629,815 B2 | 10/2003 | Lusk |
| 6,672,522 B2 | 1/2004 | Lee |
| 7,075,191 B2 | 7/2006 | Davison |
| 7,902,684 B2 | 3/2011 | Davison |
| 8,618,682 B2 | 12/2013 | Syrovy |
| 9,121,387 B2 | 9/2015 | Lumley |

(Continued)

FOREIGN PATENT DOCUMENTS

| | | |
|---|---|---|
| DE | 4234649 | 7/1993 |
| GB | 2262571 | 6/1993 |

(Continued)

*Primary Examiner* — Richard A Edgar
*Assistant Examiner* — Jason G Davis
(74) *Attorney, Agent, or Firm* — Damien G Loveland (57) ABSTRACT

Carts with aerofoils move around an elongated, looped track under the force of the wind. Carts are connected to each other in a train on the windward side of the track and collectively rotate gear wheels at the side of the track, via racks mounted on the carts that engage with the gears. The gears ultimately power an electrical generator mounted in the base of the system. The system has multiple tracks stacked one above the other and mounted on a rotatable structure that can be turned to optimize wind energy harvesting. The angle of the aerofoils is adjusted at different locations of the cart on the track when desired. Intervening buffer carts without aerofoils are used to space the carts with aerofoils. The speed of the carts is a fraction of the wind speed.

22 Claims, 7 Drawing Sheets

(56) References Cited

U.S. PATENT DOCUMENTS

| | | |
|---|---|---|
| 9,366,226 B2 | 6/2016 | Yan |
| 9,394,883 B2 | 7/2016 | Yan |
| 9,897,071 B2 | 2/2018 | Davison |
| 2004/0080166 A1* | 4/2004 | Davidson ................. F03D 5/02 290/55 |
| 2011/0148120 A1 | 6/2011 | Liao |
| 2013/0251524 A1 | 9/2013 | Grigg |
| 2018/0283350 A1 | 10/2018 | Farrant |

FOREIGN PATENT DOCUMENTS

| | | |
|---|---|---|
| WO | 2009003362 | 1/2009 |
| WO | 2011085432 | 7/2011 |
| WO | 2012078935 | 6/2012 |
| WO | 2012119478 | 9/2012 |
| WO | 2013180372 | 12/2013 |
| WO | 2018217127 | 11/2018 |

* cited by examiner

VERTICAL AXIS WIND-POWERED GENERATOR USING GUIDED CARTS

TECHNICAL FIELD

This application relates to producing energy from wind. More specifically, it relates to an apparatus, system and method using wind forces, aerofoils (airfoils) and carts on a rotatable, closed loop track to generate electricity.

BACKGROUND

Generating electricity from the wind is a strategy that is ecologically responsible. Wind energy is considered to be a source that has the minimum impact on the environment. Indeed, this strategy usually does not need fossil fuels or water. Compared to other power producing strategies, a wind energy converter has the advantages of using a 100% renewable energy source and producing no greenhouse gas emissions.

Fossil fuel power stations are a major source of pollution via the production of $CO_2$ that has a significant contribution to global warming. Recently, many countries have decided to orientate their power generating strategy toward technologies that use renewable energy sources such as wind power turbines in order to mitigate their influence on global warming.

Existing wind generators have drawbacks such as: difficult to scale; large component size, particularly aerofoil size; high towers; high cost of manufacturing, transport, installation and maintenance; and high aerofoil tip speeds resulting in safety issues and noise.

D.E. Patent Application No. 4234649A1 to Hartmann et al. relates to a wind generator using a sail mounted on parallel rails. The wind blowing in the sail generates movement of the steel frame containing the sail, creating energy.

U.S. Pat. No. 4,589,344 to Davison relates to a wind generator using a plurality of sail-cars mounted on a monorail track.

U.S. Pat. No. 6,672,522 to Lee et al. relates to a system with a sail mounted on a rail with a gear that generates electricity when movement of the sail is induced by the wind.

U.S. Pat. No. 1,791,731 to Madarasz relates to a system using a circular track with a succession of moving cylinders to generate power.

U.S. Pat. No. 3,504,988 to Stenner relates to a device that generates energy using a wind-sensitive flexible band mounted on a closed circuit.

U.S. Pat. No. 4,302,684 to Gogins relates to a device for converting wind into mechanical and electrical energy using a moving aerofoil structure.

U.S. Pat. No. 5,758,911 to Gerhardt relates to a wind power plant that uses a plurality of carriages with sails that generate electricity when movement of the carriages is caused by the wind.

U.S. Patent Application No. 20180283350 to Farrant relates to a multiple blade wind turbine that generates electricity using a plurality of aerofoils mounted on a closed loop track.

WIPO Patent application WO/2012/119478 to Zhao relates to a multi-blade, horizontal wind turbine with movable blades mounted on a rack system.

WIPO patent application WO/2018/217127 to Yakimchuk relates to a device for converting wind forces into electrical energy. The device uses a moving body along a guide belt to generate electricity.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to an apparatus, system and method for converting wind forces into electrical energy. The system includes carts with aerofoils moving along a track in a closed loop. The movement of the carts is induced by the wind blowing past the aerofoils located in the carts, which generates electricity. Multiple tracks with multiple carts in motion drive a driveshaft positioned at the centre of the system, which drives a generator. Multiple closed loop circuits are provided by several layered tracks, each with a series of carts that connect to each other depending on their location on the track. The whole track is rotatable so that the aerofoils located in the carts can form and keep a desired attack angle on the windward side of the track. The angle of each aerofoil is also adjustable on the leeward side of the track. Intervening buffer carts without aerofoils are used to space the carts with aerofoils if needed.

Depending on the particular embodiment, the present invention provides one or more of the following benefits: higher efficiency with a simpler control system; easier to scale; smaller component size, particularly aerofoil size; lower tower height; lower cost of manufacturing, transport, installation and maintenance; ground-level access to the generator; much lower aerofoil moving speed resulting in a safer operation and lower noise.

Disclosed herein is a system for harnessing energy from wind comprising: a track having a looped path and mounted on a rotatable structure; a plurality of aerofoil carts on the track, each aerofoil cart carrying an aerofoil that moves the aerofoil cart along the track when the wind blows over the aerofoil; and a gear at a side of the track positioned to be contacted by and driven by the aerofoil carts when the aerofoil carts pass the gear, wherein the gear drives an electrical generator.

Also disclosed herein is a method for harnessing energy from wind comprising: mounting a track having a looped path on a rotatable structure; placing a plurality of aerofoil carts on the track, each aerofoil cart carrying an aerofoil that moves the aerofoil cart along the track when the wind blows over the aerofoil; rotating a gear at a side of the track, the gear positioned to be contacted by and driven by the aerofoil carts when the aerofoil carts pass the gear; and driving an electrical generator by the gear.

Further disclosed herein is an aerofoil cart for harnessing energy from wind comprising: an aerofoil that moves the aerofoil cart along a track when the wind blows over the aerofoil, wherein the track has a looped path and is mounted on a rotatable structure, wherein a plurality of other aerofoil carts are on the track; and a contact surface for contacting and driving a gear at a side of the track when the aerofoil cart passes the gear, wherein the gear drives an electrical generator.

BRIEF DESCRIPTION OF DRAWINGS

The following drawings and schematic representations illustrate one or more embodiments of the invention and should not be construed as restricting the scope of the invention in any way.

DESCRIPTION

A. Glossary

Aerofoil (or airfoil)—an elongated solid, hollow or sail-like structure with surfaces that are shaped for creating a force on the aerofoil perpendicular to the wind direction when the wind blows across the surfaces.

Gear—a rotating device that has teeth in order to be coupled with another device that has teeth, such as a rack or another gear. The coupling between the other device and the gear generates a torque that can be used to transmit energy. The interaction between the other device and the gear can create a change of torque, speed, direction, or convert lateral motion to rotational.

Rack—a straight component having a line of teeth that engage with a gear. A rack moves linearly when engaged with a gear that rotates.

B. Principle

Figures 1, 2, 3, 4:
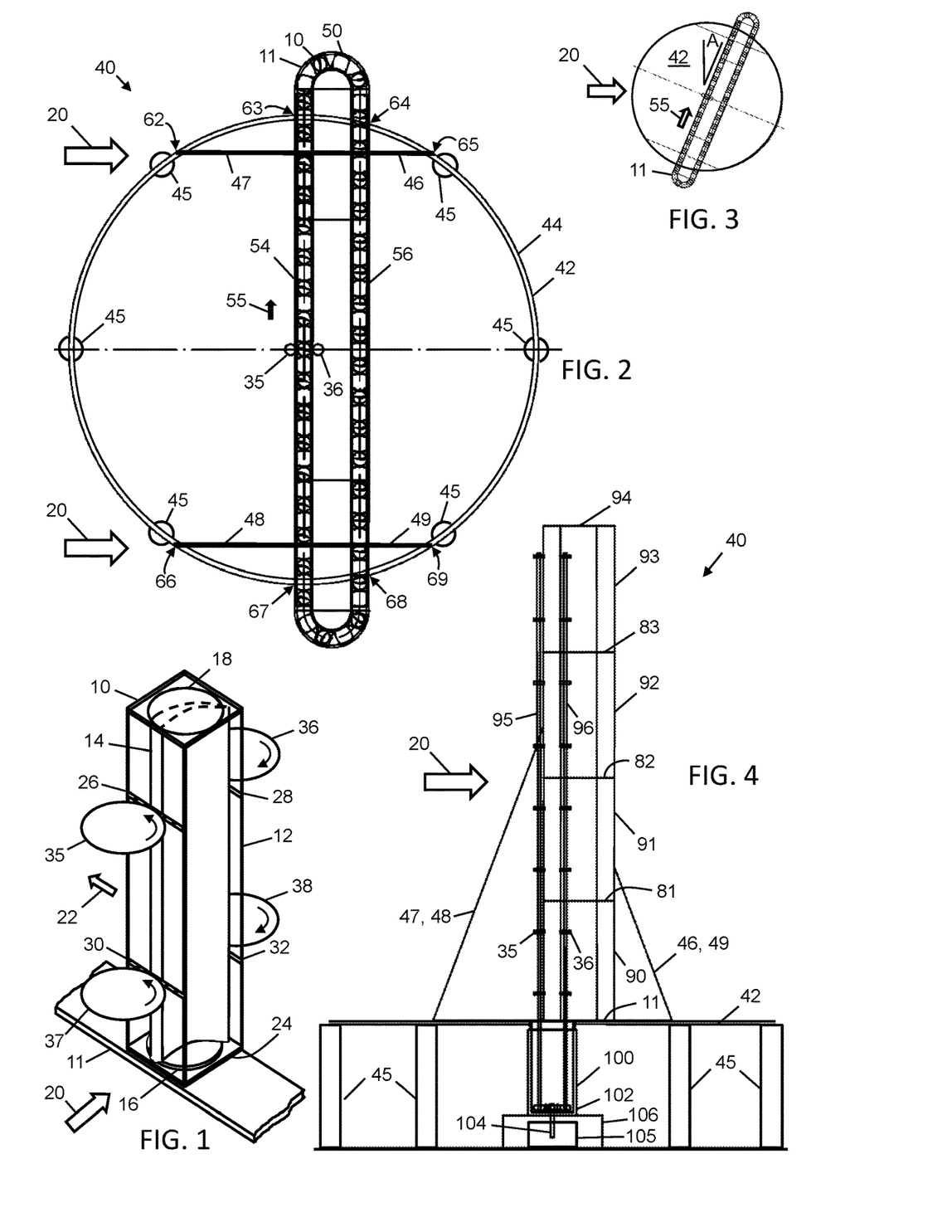
FIG. 1 is schematic perspective view of an aerofoil cart on a track.
FIG. 2 is a drawing representing an aerofoil cart system as seen from above, in its starting orientation.
FIG. 3 is a drawing representing the aerofoil cart system in an operating orientation.
FIG. 4 is a drawing representing the aerofoil cart system as seen from the front side.

Referring to FIG. 1, an aerofoil cart 10 is shown on a track 11. The frame 12 of the aerofoil cart 10 houses an aerofoil 14 mounted between a rotatable base 16 and rotatable top plate 18, which rotate through an angle sufficient to change the angular setting of the aerofoil as required. The wind blows in a direction 20 through the frame 12 and across the surfaces of the aerofoil 14, causing a lift force on the cart 10 in direction 22. The force causes the cart 10 to move along the track in the direction 22. The aerofoil 14 has a high coefficient of lift ($C_L$), which is achieved by forming and keeping a desired angle of attack. The frame 12 is mounted on a base 24 that has wheels that support the cart 10 on the track 11. Attached to the frame 12 are racks 26, 28, 30, 32 which have teeth that interlock with corresponding teeth on gear wheels 35, 36, 37, 38 on transmission shafts mounted on a rotatable structure 94 (FIG. 4). As the cart 10 moves along the track 11, it passes between the pair of gear wheels 35 and 36, and between the pair of gear wheels 37 and 38, causing the gear wheels to rotate in the directions of the curved arrows and drive the transmission shafts, which ultimately drive an electrical generator. The gear wheels 35, 36, 37, 38 therefore drive the electrical generator indirectly.

There are multiple aerofoil carts 10 on the track 11, which push and pull each other along, so that the aerofoil carts which are not driving the gear wheels directly can transmit their force to the aerofoil cart that is directly driving the gear wheels. The track 11 loops round and there are sufficient carts on it so that, when the wind is blowing, there is a continual driving force on the transmission shafts.

C. Exemplary System

FIG. 2 shows a top view of an exemplary system 40 for harnessing wind energy. The track 11 is an elongated loop mounted on a base 42. The track 11 has a supporting structure that runs on wheels around a circular supporting track 44, which forms part of the base 42, allowing the track to rotate on the base. The base 42 may be a frame that includes pillars 45, for example, which support the circular supporting track 44 above the ground. The rotatable structure 94 in which the track 11 is mounted extends vertically and is stabilized by struts 46, 47, 48, 49 each of which run on wheels on the supporting track 44. Supporting wheels are located at positions 62-69. The whole track 11 is mounted on a rotatable structure 94 so that it can be orientated with respect to the direction 20 of the wind and the speed of the carts 10 in order to maximize the efficiency of harnessing the wind power on the windward side of the track.

Multiple aerofoil carts 10 and multiple buffer carts 50 alternate with each other on the track 11. The buffer carts 50 can be the same size as the aerofoil carts 10, except that they do not carry an aerofoil. The main purpose of the buffer carts 50 is to allow the aerofoil carts 10 turn more easily at the ends of the track 11.

The direction of the force on the aerofoil carts 10 on the windward side 54 of the track 11 is shown by the arrow 55. This force causes the carts 10, 50 to move around the track 11 in a clockwise direction. Since the carts 10, 50 are all or mostly connected to each other, or are all or mostly in contact with each other, the aerofoil carts 10 on the windward side 54 may be able to push all the carts completely around the track 11. Nevertheless, depending on the alignment of the aerofoils 14 on the aerofoil carts 10 on the leeward side 56 of the track 11, the wind also provides driving force to the leeward side aerofoil carts, moving them or helping them to move around the track in a clockwise direction.

The windward side 54 of the track 11 is aligned diametrically relative to the support track 44, i.e. the centreline of the track on the windward side 54 passes through the centre of the circular supporting track 44. As the carts 10, 50 move along the track 11, they drive gear wheels 35, 36 located to either side of the track, which in turn rotate the transmission shafts, which are located symmetrically either side of the centre of the support track 44.

The orientation of the track 11 is intended to be perpendicular to the wind direction 20 as the wind is starting up and before the carts start to move.

FIG. 3 shows an example of an orientation of the track 11 when the carts 10, 50 are moving clockwise around the track in the direction of the arrow 55. In this orientation, the track 11 has been moved clockwise, about a vertical axis, on base 42 through an angle A away from the perpendicular position relative to the wind direction 20. As the carts 10, 50 gain speed, they experience a headwind, which creates an apparent wind direction that is different to the actual wind direction 20. In order to maintain an angle of attack of the aerofoils 14 at a desired setting relative to the apparent wind direction on the windward side of the track 11, the track is rotated such that the apparent wind direction is substantially perpendicular to the track.

FIG. 4 shows that the system 40 has multiple tracks 11, 81, 82, 83 stacked on each other in storeys 90, 91, 92, 93 in structure 94. In this embodiment, all the carts 10, 50 move in the same direction on each track. The aerofoils 14 located in the carts 10 form and keep a desired angle of attack on the windward side 54 so that the system 40 optimizes the amount of wind power harnessed on the windward side.

The vertical transmission shafts 95, 96 are driven by one or more gear wheels, such as gear wheels 35 and 36. The transmission shafts 95, 96 extend into a gearbox 100 in the base 42 where a drive mechanism 102 having an assembly of gears transmits rotational motion of the transmission shafts to the driveshaft 104 of an electrical generator 105 inside the generator house 106.

Figure 5:
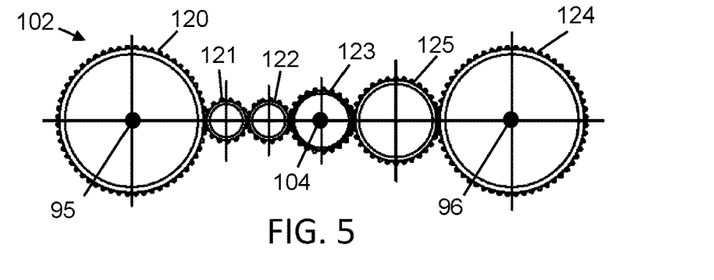
FIG. 5 shows the top view of a generator drive mechanism in more detail.

FIG. 5 shows a drive mechanism 102, which drives the driveshaft 104 of the generator 105. The transmission shaft 95 rotates anticlockwise and drives the driveshaft 104 clockwise via gears 120, 121, 122 and 123 in turn. The transmission shaft 96 rotates clockwise and drives the driveshaft 104 clockwise via gears 124, 125 and 123 in turn.

D. Track

Figure 6:
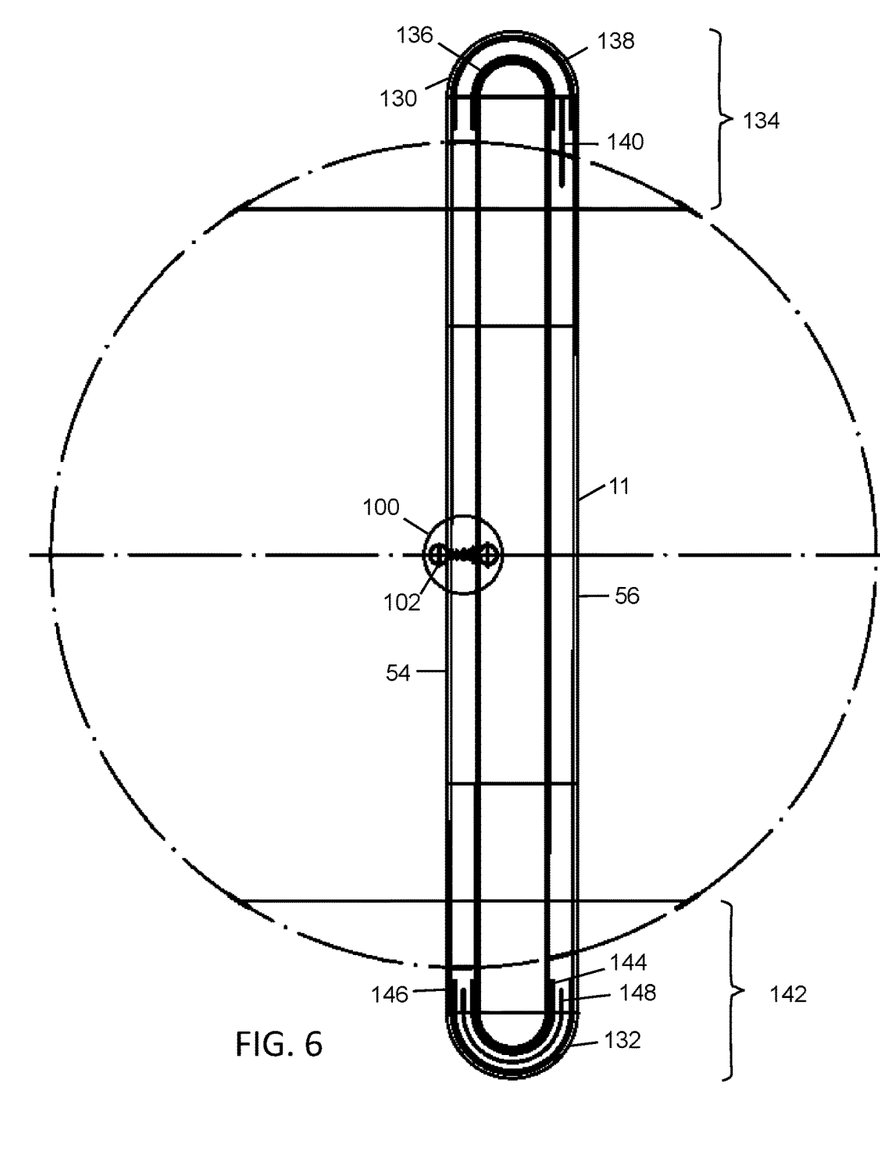
FIG. 6 is a drawing representing a system without carts as seen from above, showing the track, pushrod rails and the drive mechanism.

FIG. 6 shows the track 11 without carts 10, 50, the gearbox 100 and the drive mechanism 102. The track 11 has a semi-circular downwind turn 130, where the track turns from the straight, windward side 54 to the straight, leeward side 56. The track 11 has a semicircular upwind turn 132, where the track turns from the leeward side 56 to the windward side 54.

In end region 134 of the track 11, which includes the downwind turn 130, the track has an inner pushrod rail 136, outer pushrod rail 138 and middle pushrod rail 140. Herein, "inner" and "outer" are in reference to the centreline of the carts 10, 50 or the centreline of the path of the track 11. The pushrod rails 136, 138, 140 activate pushrods on the carts 10, 50 in order to control various mechanisms on the carts. These mechanisms operate the locking of the aerofoil 14 in a set angular position, the unlocking of the aerofoil from its set angular position, the connecting of adjacent carts and the disconnecting of adjacent carts. The track 11 need not be full of carts 10, 50. In end region 142 of the track 11, which includes the upwind turn 132, the track has an inner pushrod rail 144, outer pushrod rail 146 and middle pushrod rail 148. These rails 144, 146, 148 also activate pushrods on the carts 10, 50 in order to control the same mechanisms on the carts. Guides, not visible here, keep the carts 10, 50 on the track 11.

Figure 7:
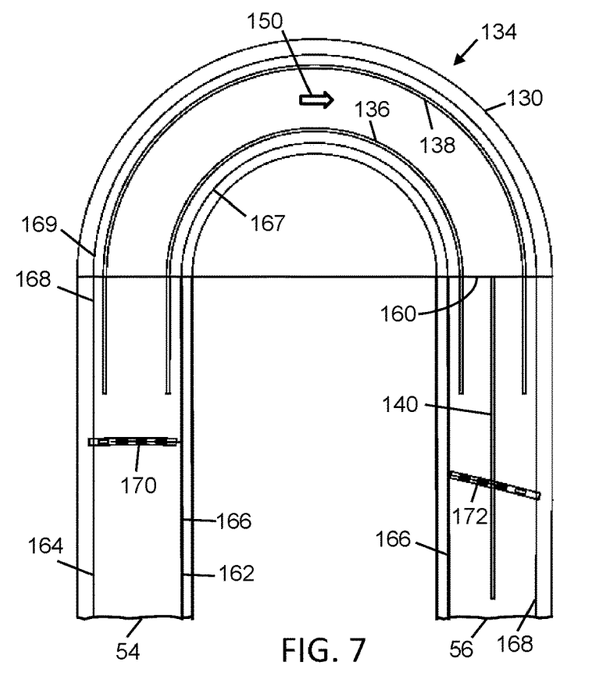
FIG. 7 shows the downwind turn in a track.

FIG. 7 shows end region 134 of the track 11 closer in, where the arrow 150 shows the direction of motion of the carts 10, 50. The inner pushrod rail 136 and outer pushrod rail 138 both start in the windward side 54 of the track 11, extend around the downwind turn 130 and terminate in the leeward side 56 of the track. These pushrod rails 136, 138 cause adjacent carts 10, 50, which are locked together on the windward side 54 of the track, to unlock from each other before they move into the downwind turn 130. The pushrod rails 136, 138 keep the carts 10, 50 unlocked as they move round the downwind turn 130. When the pushrod rails 136, 138 terminate, they cause adjacent carts 10, 50 to lock together again.

The middle pushrod rail 140 starts at or near the end 160 of the downwind turn 130 and terminates part way along the leeward side 56 of the track 11. The middle pushrod rail 140 causes the aerofoil 14 to become unlocked from its set angular position as the aerofoil carts 10 pass over the start of the middle pushrod rail. The aerofoils 14 remain unlocked as long as the aerofoil cart 10 is over the middle pushrod rail 140. By unlocking the aerofoils 14, they can be set at a more efficient angle for travel along the leeward side 56.

The track 11 has inner guides 162 and outer guides 164, which guide the carts 10, 50 around the track. The guides 162, 164 each extend in a loop round the track 11, and are in the form of low-rise walls on which side guide wheels on the carts 10, 50 run. The inner guide 162 has straight sections 166 on the windward side 54 and the leeward side 56, and curved sections 167 on the downwind turn 130 and upwind turn 132. The outer guide 164 has straight sections 168 on the windward side 54 and the leeward side 56, and curved sections 169 on the downwind turn 130 and upwind turn 132.

Supporting wheels 170, 172 are shown, which support the track 11 on the support track 44 and allow it to be rotated as a whole. The supporting wheels 170, 172 are in locations 63, 64 of FIG. 2.

Figure 8:
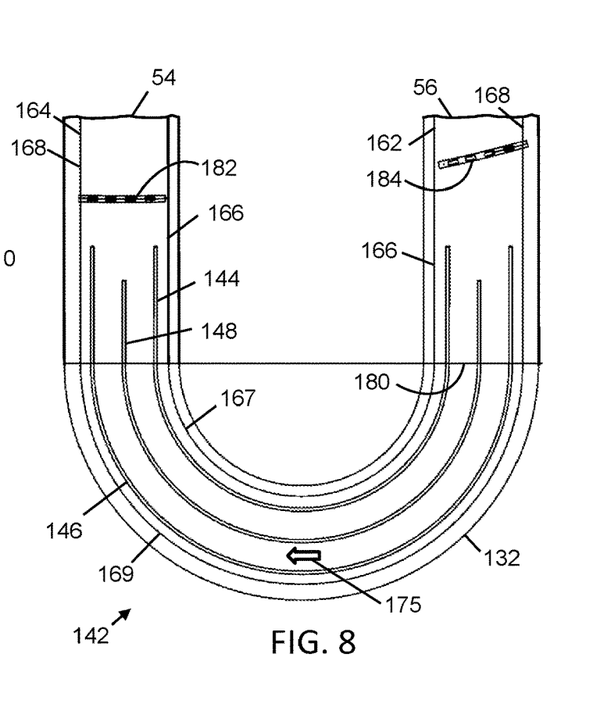
FIG. 8 shows the upwind turn in a track.

FIG. 8 shows end region 142 of the track 11 closer in, with cart motion in the direction of arrow 175. The inner pushrod rail 144 and outer pushrod rail 146 both start in the leeward side 56 of the track 11, extend around the upwind turn 132 and terminate in the windward side 54 of the track. These pushrod rails 144, 146 cause adjacent carts 10, 50, which are locked together on the leeward side 56 of the track, to unlock from each other before they move into the upwind turn 132. The pushrod rails 144, 146 keep the carts 10, 50 unlocked as they move round the upwind turn 132. When the pushrod rails 144, 146 terminate, they cause adjacent carts 10, 50 to lock together again.

The middle pushrod rail 148 starts before and near the start 180 of the upwind turn 132 and terminates part way along the windward side 54 of the track 11. The middle pushrod rail 148 causes the aerofoil 14 to become unlocked from its set angular position and stay unlocked as the aerofoil carts 10 pass over the middle pushrod rail. By unlocking the aerofoils 14, they can be set at a desired angle of attack for travel along the windward side 54.

The inner guide 162 is shown with straight sections 166 on the windward side 54 and the leeward side 56, and a curved section 167 on the upwind turn 132. The outer guide 164 has straight sections 168 on the windward side 54 and the leeward side 56, and a curved section 169 on the upwind turn 132.

Supporting wheels 182, 184 are shown, which support the track 11 on the support track 44 and allow it to be rotated as a whole. The supporting wheels 182, 184 are in the positions 67, 68 of FIG. 2.

E. Cart Guides

Figure 9:
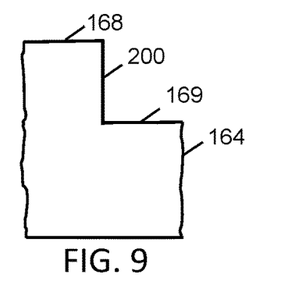
FIG. 9 is a side view of a transition in a cart guide.

FIG. 9 shows a portion of outer guide 164, showing the transition 200 between the straight section 168 and the curved section 169. Similar transitions are present between each straight section and each curved section everywhere in both the outer guide 164 and inner guide 162. All the straight sections 166, 168 are of the same height and are higher than all the curved sections 167, 169, which are the same height as each other.

Figure 10:
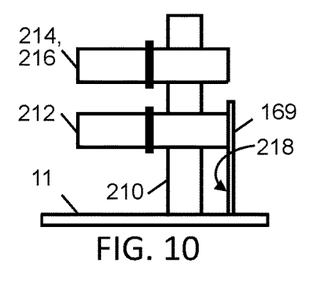
FIG. 10 is an end view of the wheels on one side of the cart in relation to a cross-sectional view of a guide in the track turns.

FIG. 10 shows an end view of a cart wheel 210 that supports (in part) a cart 10, 50 on the track 11. On this side of the cart 10, 50 there is a middle, lower guide wheel 212 and two outer, upper guide wheels 214, 216. The middle, lower guide wheel 212 runs along the outer surface 218 of a curved section 169 of the outer guide 164.

Figure 11:
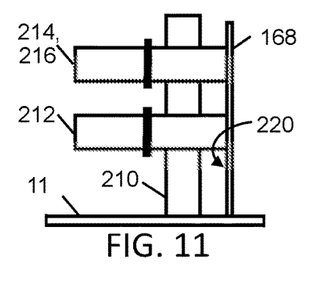
FIG. 11 is an end view of the wheels on one side of the cart in relation to a cross-sectional view of a guide in the straight part of the track.

FIG. 11 shows an end view of a cart wheel 210, with the middle, lower guide wheel 212 and the two outer, upper guide wheels 214, 216. All guide wheels 212, 214, 216 run along the outer surface 220 of a straight section 168 of the outer guide 164.

Figure 12:
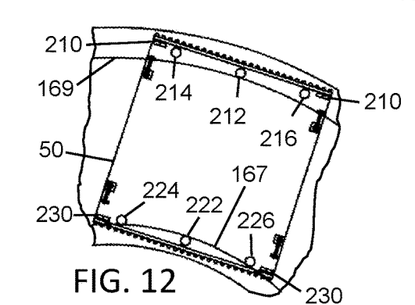
FIG. 12 is a top view of a buffer cart on a track turn.

FIG. 12 shows that there is a similar arrangement of guide wheels 222, 224, 226 on the other side of a buffer cart 50. The same applies to the aerofoil carts 10. As the carts 10, 50 move around the turns 130, 132 in the track 11, the middle, lower guide wheels 212, 222 run along the outer surfaces of the curved sections 169, 167 of the outer guide 164 and inner guide 162 respectively, while the outer, upper guide wheels 214, 216, 224, 226 are not in contact with any part of the guides 162, 164. As the carts 10, 50 move along the straight windward and leeward sides 54, 56 of the track 11, the guide wheels 212, 214, 216 run along the outer surfaces of the straight sections 168 of the outer guide 164, and the guide wheels 222, 224, 226 run along the outer surfaces of the straight sections 166 of the inner guide 162. Two supporting cart wheels 210 on the left side of the cart 50 are visible, as are the two supporting cart wheels 230 on the right side of the cart. Cart wheels 210, 230 are mounted on swivel casters to allow for easier movement of the carts 10, 50 around the track 11. More cart guides providing guide surfaces similar to surfaces 218, 220 can be added in the middle of the storeys if needed.

F. Pushrod Rails

Figure 13:
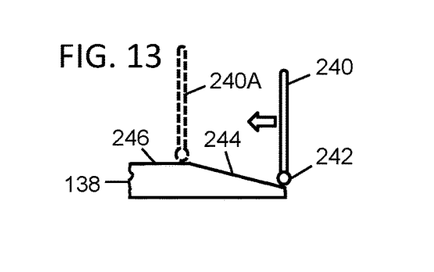
FIG. 13 is a side view of pushrod activation.

FIG. 13 shows a portion of a pushrod rail, such as pushrod rail 138. A pushrod 240 descends from a cart 10, 50 and terminates with a bearing 242, such as a small wheel. As the cart 10, 50 approaches the pushrod rail 138 in the direction of the arrow, the bearing 242 engages with the leading ramp 244 of the pushrod rail 138 and pushes the pushrod 240 upwards into the cart 10, 50 to position 240A, operating a mechanism in the cart. In this case, the mechanism unlocks one cart 10, 50 from an adjacent cart. The upper surface 246 of the pushrod rail 138 maintains the pushrod 240 in the elevated position as the cart 10, 50 moves over it. The pushrod rail 138 terminates with a ramp similar to ramp 244. All other pushrod rails 136, 140, 144, 146, 148 are of similar construction.

G. Carts

Figure 14:
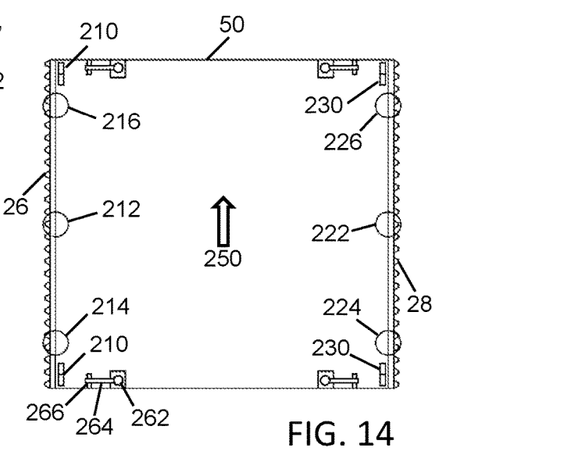
FIG. 14 is a top view of a buffer cart.

FIG. 14 shows a top view of a buffer cart 50, which moves around the track 11 in the direction of the arrow 250. On the left side of the buffer cart 50, the guide wheels 212, 214, 216 are shown. On the right side of the buffer cart 50, the guide wheel 222, 224, 226 are shown. Racks 26, 28 to the left and right of the cart 50 impart driving force to the transmission shafts 95, 96 respectively. Cart wheels 210, 230 are shown on the left and right sides of the buffer cart 50 respectively.

From pushrod 262 a locking arm 264 projects sideways and is free to move in a vertical direction in slot 266 as the pushrod moves up and down. When in the lower position, the locking arm 264 engages with a slot 270 (FIG. 17) in tab 272 on an adjacent aerofoil cart 10, to connect the two carts together. When in the upper position, the locking arm 264 is disengaged with the slot 270, and the carts 10, 50 are not connected together. There are two pushrods 262, locking arms 264 and slots 266 at the front and at the back of the buffer cart 50.

Figure 15:
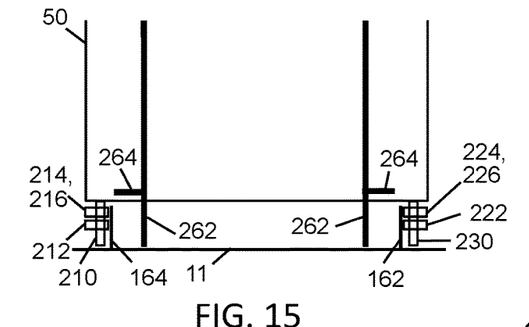
FIG. 15 is an end view of a lower portion of the buffer cart.

FIG. 15 is a rear view of a lower portion of the buffer cart 50 in FIG. 14, supported on track 11 by cart wheels 210, 230. The pushrods 262 and locking arms 264 are shown in the lower position. Pushrods 262 extend upwards to the top of the buffer cart where there are further locking arms that project sideways from the pushrods and serve to lock the tops of adjacent carts together. Furthermore, they may be similar connection mechanisms part way between the top and bottom for a more secure connection of adjacent carts. Guide wheels 212, 214, 216 are engaged with the outer surface of the outer guide 164. Guide wheels 222, 224, 226 are engaged with the outer surface of the inner guide 162. The buffer cart 50 extends upwards and has similar guide wheels on the top, which engage with similar guides above the track 11.

Figure 16:
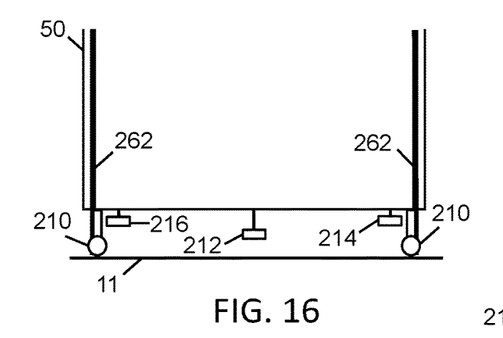
FIG. 16 is a side view of the lower portion of the buffer cart.

FIG. 16 is a view of the left side of the buffer cart 50 of FIGS. 14 and 15, showing cart wheels 210 supporting the buffer cart on the track 11. The left side guide wheels 212, 214, 216 and the pushrods 262 are visible.

Figure 17:
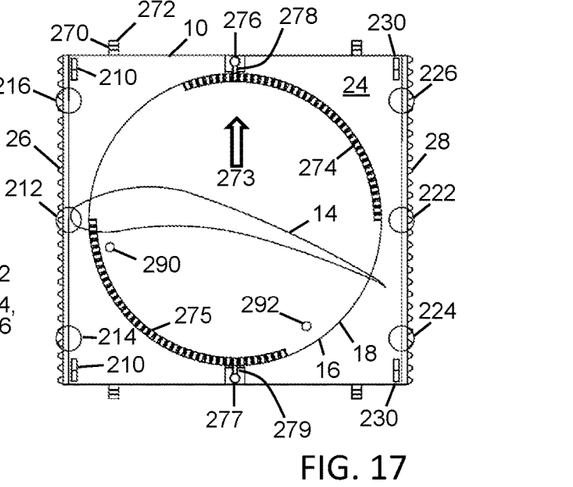
FIG. 17 is a top view of an aerofoil cart.

FIG. 17 is a top view of an aerofoil cart 10, which moves around the track 11 in the direction of the arrow 273. On the left side of the aerofoil cart 10, the guide wheels 212, 214, 216 are shown. On the right side of the aerofoil cart 10, the guide wheels 222, 224, 226 are shown. Racks 26, 28 to the left and right of the aerofoil cart 10 impart driving force to the transmission shafts 95, 96 respectively. Cart wheels 210, 230 are shown on the left and right sides of the aerofoil cart 10 respectively.

The aerofoil 14 mounted inside the frame 12 (FIG. 18) is fixed between the top surface of a rotatable base 16 and the bottom surface of a rotatable top plate 18 of the frame structure. The bottom of rotatable base 16 has bearings, wheels or a pivot which support the rotatable base and the aerofoil 14 on cart base 24 and allow the aerofoil to rotate when unlocked. The rotatable base 16 has two series of notches 274, 275 on its edge. Pushrods 276, 277 support locking arms 278, 279, which, when the pushrods are in their lowered position, each engage with one of the notches 274, 275 respectively, holding the rotatable base 16 and the aerofoil 14 in a fixed angular orientation relative to the aerofoil cart 10. When the pushrods 276, 277 are raised to their upper position, the locking arms 278, 279 disengage with the notches 274, 275, allowing the aerofoil 14 and the rotatable base 16 to either freely rotate or be rotated intentionally to another desired angular position. Pushrods 276, 277 extend to the top of the cart 10, where further locking arms project, and are used for locking additional notches on rotatable top plate 18, which is connected to and moves with the rotatable base 16. Furthermore, locking arms may project from the pushrods 276, 277 part way between the bottom and the top of the cart 10 to lock further circular plates that rotate with the aerofoil.

Projecting upwards from the top of the rotatable top plate 18 are two control pins 290, 292. These control pins 290, 292 engage with channels above the aerofoil cart 10 that cause the aerofoil 14 to turn as the aerofoil cart moves along particular sections of the track 11. Control pins 290 can be different lengths on different carts 10. For example, some control pins 290A are longer than other control pins 290B such that a channel can control carts with control pins 290A but not carts with control pins 290B. However, a channel with walls that extend further down is able to engage with both control pins 290A and 290B.

Figure 18:
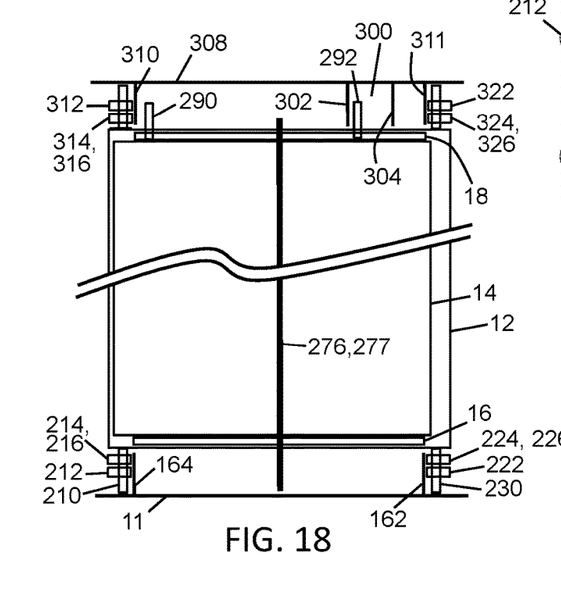
FIG. 18 is a cut end view of the aerofoil cart.

FIG. 18 is a cut, rear view of the aerofoil cart 10 in FIG. 17, supported on track 11 by cart wheels 210, 230. Guide wheels 212, 214, 216 are engaged with the outer surface of the outer guide 164. Guide wheels 222, 224, 226 are engaged with the outer surface of the inner guide 162. The pushrods 276, 277 are shown in their lower position. Control pin 292 is shown in channel 300 formed by walls 302, 304 suspended from an overhead track frame 308, which forms part of the structure 94 (FIG. 4). Here, the channel 300 is considerably wider than the control pin 292, corresponding to an entrance region of the channel which is wide enough to accept the control pin 292 from a range of angles of the aerofoil 14. The aerofoil 14 is shown between rotatable base 16 and rotatable top plate 18. As the aerofoil cart 10 advances along the track, the channel 300 becomes narrower and its path is displaced. The displacement causes a channel wall 302, 304 to act on the control pin 292, forcing it to one side or another, which causes the aerofoil 14 to rotate accordingly. At the end of the channel 300, the aerofoil 14 is set to a desired angle. In order to reduce the resistance of the control pin 292 against the channel walls 302, 304, the control pin is rotatable on a bearing or includes a rotatable cylindrical outer bearing. On different storeys of the frame 94, the exit of channel 300 may be set to different angles to account for different wind speeds at different heights above the ground.

Also suspended from the overhead track frame 308 is an outer overhead guide 310 and an inner overhead guide 311. The overhead guides 310, 311 have a symmetrically opposite form to the guides 164, 162 respectively. Upper guide wheels 312, 314, 316 on the left of the aerofoil cart 10 rotate along the outer surface of the left overhead guide 310. Upper guide wheels 322, 324, 326 on the right of the aerofoil cart 10 rotate along the outer surface of the right overhead guide 311. Control pin 290 (in form 290A or 290B) enters another channel elsewhere on the track.

H. Track and Aerofoil Orientation

Figure 19:
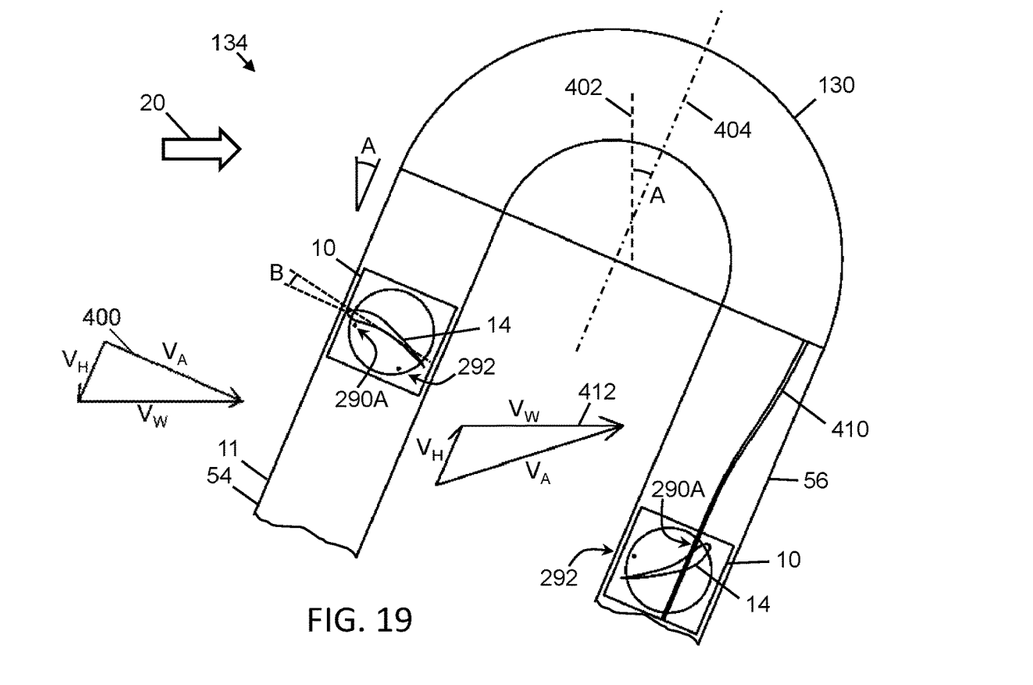
FIG. 19 is a top view of the downwind turn of a track in an operating orientation, showing aerofoil angles and aerofoil guide.

FIG. 19 shows the end region 134 of the track 11 at the downwind turn 130, where the track is angled clockwise through angle A from perpendicular to the wind direction 20. The carts 10 are moving at about 40% of the wind speed. Vector diagram 400 shows the wind velocity $V_W$, the headwind velocity $V_H$ experienced by the aerofoil cart 10 as it moves with velocity $-V_H$ on the windward side 54 of the track 11, and the apparent wind velocity $V_A$ experienced by the aerofoil cart. The track 11 has been rotated away from the wind, from the perpendicular orientation 402 to orientation 404 such that the apparent wind velocity $V_A$ is in a direction that is perpendicular to the direction of the windward side 54 of the track.

By moving the track 11 as a whole, the angles of the aerofoils 14 do not need to be adjusted in response to the speed or direction of the wind. When the aerofoil carts 10 move along the straight, windward side 54 of the track 11, the arms 278, 279 on the pushrods 276, 277 are engaged in notches on rotatable base 16 (FIG. 17) in order to lock the angular position of the aerofoil 14. As an example, the angle of attack B to which the aerofoils 14 are set is 10-15° to the apparent wind velocity $V_A$. As the wind speed increases, the track 11 is turned further clockwise in order to maintain the apparent wind direction perpendicular to the direction of the aerofoil carts 10. If the carts move anticlockwise around the track, the rotation of the track will be in the opposite direction.

In the downwind turn, 130, the aerofoils 14 remain fixed, which helps them to be pushed around the downwind turn by the wind. As the aerofoil carts 10 enter the straight, leeward section 56 of the track 11, the pushrod rail 140 (FIG. 7) raises the pushrods 276, 277 to unlock the aerofoils 14. At this point, the control pin 290A has entered channel 410 suspended from the overhead track frame 308. As the aerofoil cart 10 moves along the leeward section 56, the channel 410 deviates inwards, causing the control pin 290A to rotate the aerofoil 14 anticlockwise to an optimal angular position. In this position, the aerofoil 14 provides some sideways force to help drive the aerofoil cart 10 clockwise around the track 11. However, the main working area is the windward side 54 of the track 11, where the carts 10, 50 are connected in a straight line and collectively push on the teeth of the gear wheels 35, 36, 37, 38 to rotate them.

The channel 410 is, in some embodiments, adjustable so that the amount of rotation of the aerofoils 14 can be optimized depending on the wind speed.

Vector diagram 412 shows the wind velocity $V_W$, the headwind velocity $V_H$ experienced by the aerofoil cart 10 as it moves with velocity $-V_H$ on the leeward side 56 of the track 11, and the apparent wind velocity $V_A$ experienced by the aerofoil cart. The angular position of the aerofoil 14 of cart 10 is locked before the control pin 290A leaves the channel 410. The aerofoil 14 of cart 10A with shorter control pin 290B will be rotated freely by the wind such that it is substantially parallel to the apparent wind velocity $V_A$. All control pins 292 enter channel 300 (FIG. 21) to set the aerofoils 14 to the desired position for the windward side 54.

Figure 20:
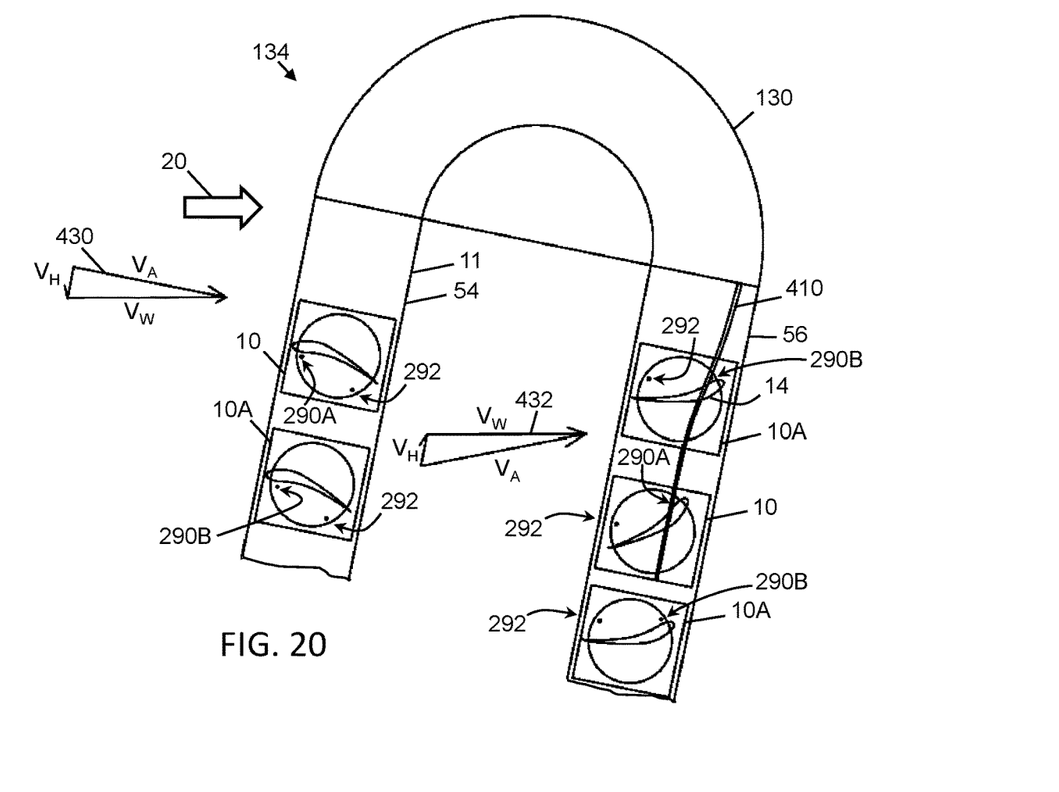
FIG. 20 is a top view of the downwind turn of a track at another operating orientation, showing aerofoil angles and aerofoil guide.

FIG. 20 shows the end region 134 of the track 11 at the downwind turn 130, where the track is set at a smaller angle to the wind 20 than in FIG. 19 because the aerofoil carts 10 are moving along the track, at about 20% of the wind speed. Vector diagram 430 shows the wind velocity $V_W$, the headwind velocity $V_H$ experienced by the aerofoil carts 10, 10A as they move with velocity $-V_H$ on the windward side 54 of the track 11, and the apparent wind velocity $V_A$ experienced by the aerofoil carts. The track 11 has been rotated such that the apparent wind velocity $V_A$ is in a direction that is perpendicular to the direction of the windward side 54 of the track.

As the aerofoil carts 10 enter the leeward section 56, the pushrod rail 140 (FIG. 9) raises the pushrods 276, 277 to unlock the aerofoils 14. At this point, the control pin 290A has entered channel 410 suspended from the overhead track frame 308. As the aerofoil cart 10 moves along the leeward section 56, the channel 410 causes the control pin 290A to rotate the aerofoil 14 anticlockwise to an angular position set by the channel. In this position, the aerofoil 14 provides some sideways force to help drive the aerofoil cart 10 clockwise around the track 11.

In contrast, the aerofoil cart 10A has the control pin 290B (shorter than 290A, so it will not enter channel 410), so that when it enters the leeward section 56 the angle of the aerofoil will be changed automatically by the wind. Its effective angle of attack is close to 0° and so it provides little driving force. Only some of the aerofoil carts 10 on the leeward side 56 are needed to generate sufficient force to move all the carts 10, 10A, 50 along the leeward side. Vector diagram 432 shows the wind velocity $V_W$, the headwind velocity $V_H$ experienced by the aerofoil carts 10, 10A as they move with velocity $-V_H$ on the leeward side 56, and the apparent wind velocity $V_A$ experienced by the aerofoil carts.

The number of aerofoil carts 10 with the control pin 290A and number of aerofoil carts 10A with the control pin 290B can be chosen with a ratio that depends on the particular embodiment. The minimum requirement is that there is at least enough overall force to move all the carts 10, 10A, 50 along the leeward side 56 of the track 11. Control pins 292 enter channel 300 (FIG. 21) to set all the aerofoils 14 to the desired position for the windward side 54.

Figure 21:
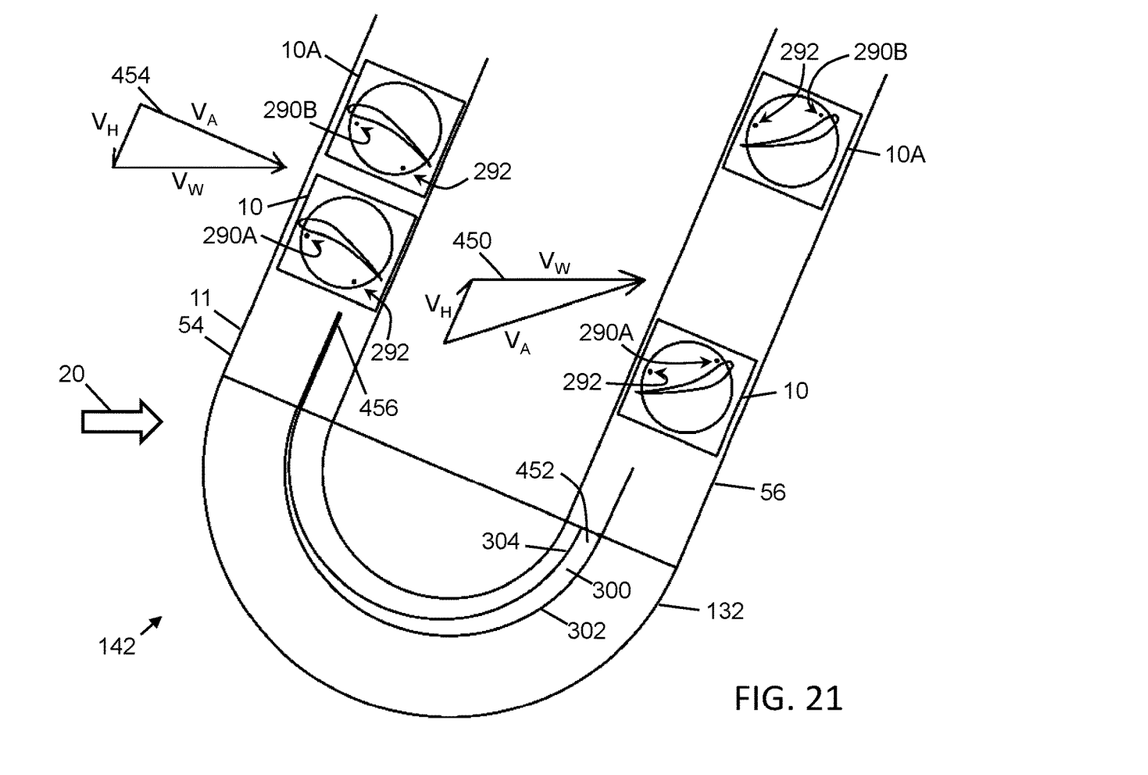
FIG. 21 is a top view of the upwind turn of a track in an operating orientation, showing aerofoil angles and aerofoil guide.

FIG. 21 shows the region 142 of the track 11 at the upwind turn 132, where the track is angled clockwise from perpendicular to the wind direction 20. Vector diagram 450 shows the wind velocity $V_W$, the headwind velocity $V_H$ experienced by the aerofoil carts 10, 10A as they move with velocity $-V_H$ on the leeward side 56 of the track 11, and the apparent wind velocity $V_A$ experienced by the aerofoil carts. Aerofoil cart 10 has had its aerofoil 14 set by the control pin 290A in channel 410 (FIG. 20). The aerofoil on aerofoil cart 10A is showing an angle corresponding to it having been set by the direction of the wind as the cart 10A moved around the downwind turn 130 of the track, which is possible as the cart 10A has pin 290B, which does not engage with channel 410, and the aerofoil 14 on it is therefore free to rotate when unlocked. As the aerofoil carts 10, 10A approach the upwind turn 132, the control pins 292, which are present on all aerofoil carts 10, 10A, are captured by the wide mouth 452 of channel 300 defined by walls 302, 304. As such, the channel 300 is able to accept the control pins 292 of aerofoil carts 10, 10A with their aerofoils 14 previously set in a variety of angular positions.

After the control pins 292 on the aerofoil carts 10, 10A enter the channel 300, the pushrod rail 148 (FIG. 8) raises the pushrods 276, 277 to unlock the aerofoils 14. As the aerofoil carts 10, 10A move along the upwind turn 132, the channel 300 causes the control pin 292 to rotate the aerofoil 14 to the optimal angular position for the windward side 54 of the track 11. The trailing end 456 or exit of the channel 300 determines the angular setting of the aerofoils 14. Channel 300 sets all of the aerofoils 14 to the same angle. The angle of the aerofoils 14 is maintained for the length of the windward side 54.

When the wind is too strong and the whole system has to be shut down, an another channel and pushrod section on the windward side 54 will be activated so that pins 290A and 290B will turn the aerofoils to form an angle of attack at which the aerofoils will generate a minimum lift (i.e. motive) force.

Vector diagram 454 shows the wind velocity $V_W$, the headwind velocity $V_H$ experienced by the aerofoil carts 10, 10A as they move with velocity $-V_H$ on the windward side 54 of the track 11, and the apparent wind velocity $V_A$ experienced by the aerofoil carts.

Figure 22:
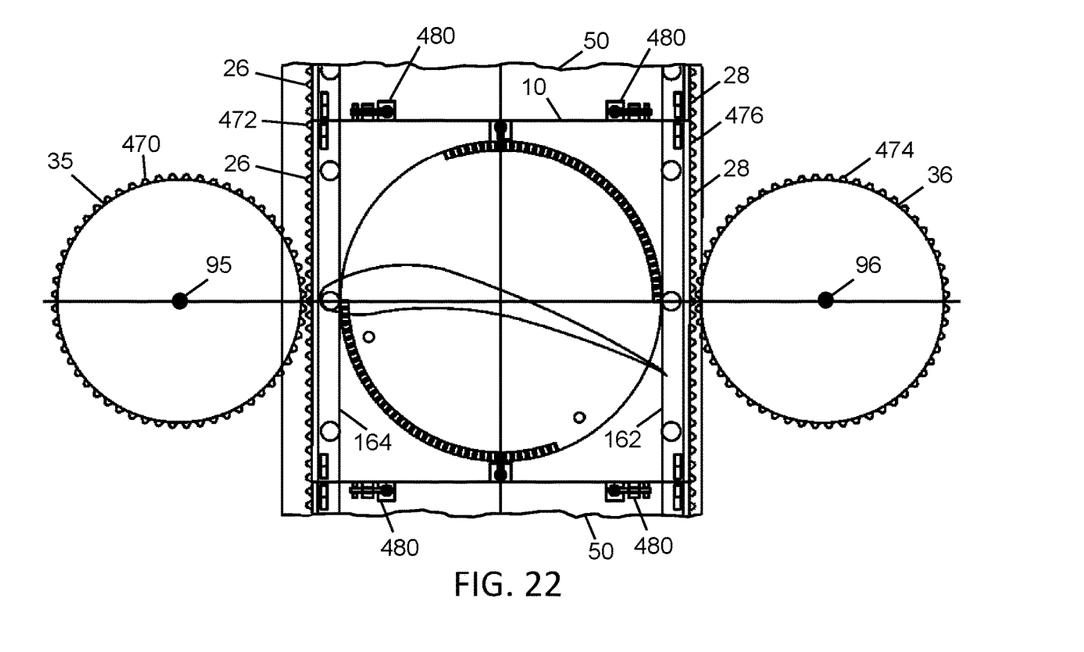
FIG. 22 is a top view showing how the carts drive the transmission shafts.

FIG. 22 shows aerofoil cart 10 guided by guides 162, 164 and passing between gear wheels 35, 36 on transmission shafts 95, 96 respectively. The gear wheels 35, 36 are driven by racks 26, 28 on the sides of the cart 10, via interlocking teeth 470, 472 and 474, 476 respectively. The aerofoil cart 10 is connected to adjacent buffer carts 50 via connector mechanisms 480. A connector mechanism includes, for example, pushrod 262 and arm 264 on a buffer cart 50 and a slot 270 in tab 272 on the adjacent aerofoil cart 10 (FIGS. 14, 17). The carts 10, 50 are connected with such a relative spacing that the spacing between teeth 472 on one cart continues the same spacing pattern as the teeth on an adjacent cart.

I. Methods

Figure 23:
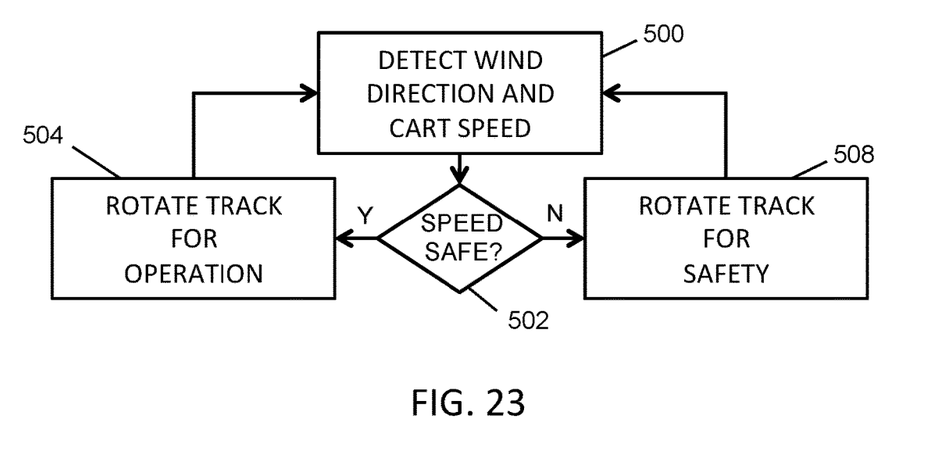
FIG. 23 is a method of operating the system.

FIG. 23 shows a method for operating the system 40 for harnessing wind energy using guided aerofoil carts 10. In step 500, the wind direction 20 and speed of the aerofoil carts 10 (and/or buffer carts 50) are detected. In step 502, the speed of the carts 10, 50 and/or the speed of the wind is compared with a threshold to determine whether the speed is suitable for safe operation of the system 40. In step 504 in response to determining that the speed of the carts and/or wind is a safe speed, the track is rotated so that the apparent wind velocity experienced by the carts is perpendicular to their direction on the windward side of the track. This rotation results in normal operation of the system, which may be optimum operation. The method then reverts to step 500. If, in step 502, the speed of the carts 10, 50 and/or the speed of the wind is determined to be over the threshold, i.e. too high for safe operation of the system 40, then the system proceeds to step 508. In step 508, in response to determining that the speed of the carts and/or wind is not a safe speed, the track is rotated so that the wind does not drive the carts so fast. For example, the track is rotated anticlockwise, so that angle A is negative. In some cases, the track is rotated such that there is no or very little movement of the carts around the track. The method then reverts to step 500.

Figure 24:
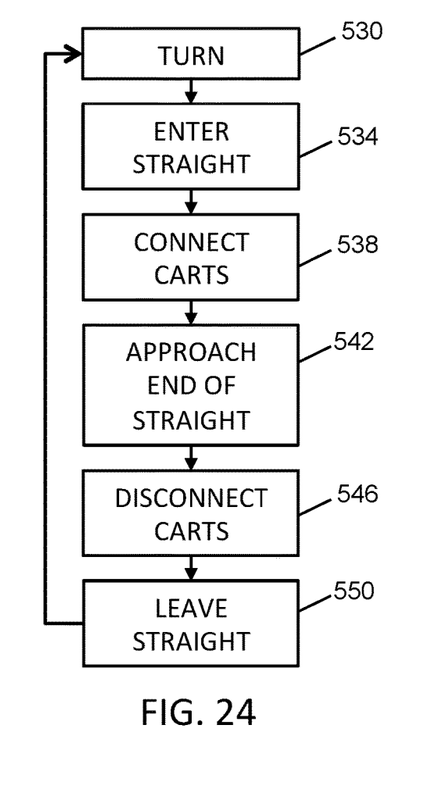
FIG. 24 is a method of connecting and disconnecting the carts.

FIG. 24 shows a method for connecting and disconnecting the carts 10, 50. In step 530, two adjacent carts are moving around a turn, and they are not yet connected at this point to each other. In step 534, the carts enter a straight section of the track. In step 538, the carts are connected to each other. In step 542, the carts approach the end of the straight section. In step 546, the carts are disconnected from each other. In step 550, the carts leave the straight section. Following this, step 530 is repeated as the carts turn on a curved section of the track.

In some embodiments, the position of the exit of the channel 410 can also be moved to reduce the forces on the aerofoils on the leeward side 56 of the track 11.

In order to control the angle of the track, sensors are implemented along the tracks to obtain information such as the speed of the carts 10, 50. Sensors are also installed for the detection of the wind direction and speed. Other sensors are implemented on the carts to detect whether the carts are locked or unlocked, and to detect the angular position of the aerofoil.

J. Variations

Figure 25:
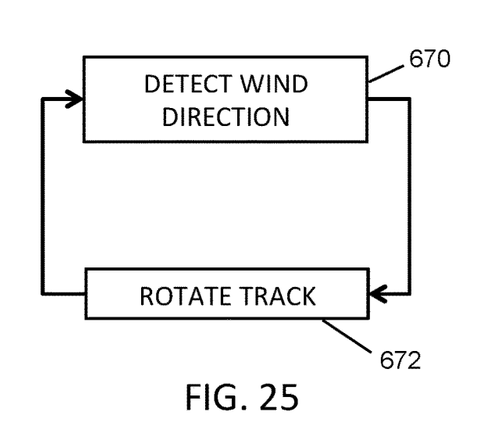
FIG. 25 is a method of operating an alternate embodiment of the system.

In one embodiment, when several tracks are stacked on each other, the carts 10, 50 on each track move in alternating directions. For example, the carts 10, 50 on track 11, 82 move clockwise and the carts on tracks 81, 83 move anticlockwise. By alternating the directions of cart movement on the tracks, the overall forces on the structure 94 are more balanced than if the carts 10, 50 moved on all the tracks 11, 81, 82, 83 in the same direction. The transmission shafts are coupled by alternately one and two gears on alternate levels of track to compensate for the different cart directions. Alternately, the transmission shafts may be segmented, with adjacent segments connected by gears and possibly different ratios, so that the segments can rotate in opposite directions in adjacent storeys. The track 11 is oriented so that it is perpendicular to the wind direction, and is not adjusted according to the cart speed. FIG. 25 shows a method for operating this embodiment. In step 670, the wind direction 20 is detected. In step 672, in response to determining the wind direction 20, the track is rotated so that the windward side of the track is perpendicular to the wind direction. The method then reverts to step 672 in a continuous loop.

Connecting tabs and arms may be located differently and on different carts, and the connecting mechanism may be different. This connector may be made of a solid material that can hold the load between the two adjacent carts such as stainless steel or a strong polymer.

The height of the pillars 45 can be very low (just higher then the height of the generator house). Then a frame-like base which supports the storeys 90, 91, 92, 93 may be added.

In some embodiments, the carts are all connected to each other and form a loop. In this case, alternate connection mechanisms are used to allow the carts to move around the curved portions of the track.

In some embodiments, the connectors have a shock absorber device such as a spring and/or damper in order to decrease the stress within the connectors.

The gearing between the carts and different storeys of the transmission shafts 95, 96 may vary to allow for wind shear, which causes a greater force on the aerofoils on the upper tracks than on the lower tracks. Alternately, the height of the aerofoils may become smaller as the height of the track increases in order to have a more balanced torque on the different levels of the transmission shafts. In other embodiments, the number of intervening buffer carts is increased for the higher levels of track. Alternately The attack angle of aerofoils 14 on storeys 90, 91, 92, 93 can be set differently to take advantage of higher wind speed on higher storeys.

In some embodiments, the aerofoil carts are made longer so that there is no need to use buffer carts.

A wire mesh may cover the whole or part of the structure to protect animals. Lights may be mounted on the structure in order to alert birds of its presence. Various lighting effects may be applied to the structure for aesthetics.

Mechanical controls may be replaced with electromagnetic controls triggered by sensors and/or timers. For example, the rotatable base 16 of an aerofoil cart 14 may have teeth along its outer edge which are coupled with a gear wheel on the base 24 of the aerofoil cart. The angle of the aerofoil 14 is then controlled by driving the gear as and when required, providing that the aerofoil is unlocked while doing so. The gear wheel is connected to a processor or control unit, and the rotation of the rotatable base 16 is controlled electronically.

In some embodiments the orientation of the aerofoil 14 is adjusted on the run or in real time, in response to the force and orientation of the incoming wind, in order to maximize energy production.

Control pins may be retracted or extended electromagnetically, as and when required for optimum harvesting of the wind energy. For safe shut down of the system when the wind is too strong, control pins 290A and 290B engage with safety channels that are of similar construction to channels 300, 410, which set the angle of the aerofoil to a safe position for the wind conditions. In some embodiments the track is rotated and the aerofoils are rotated to safety positions when the wind is too strong.

In some embodiments, the track has a different shape. For example, one or both of the windward and leeward sides is not straight, and the angles of the aerofoils are adjusted along the windward side.

Optionally, upper cart wheels may be installed on the carts 10, 50 to retain the carts a fixed distance from an overhead track mounted on the overhead track frame 308.

Channels for controlling the angular orientation of the aerofoils may be shaped differently.

Depending on wind speed, additional output generators can be connected so that when the wind speed is higher than the nominal design speed but still safe for operating, the system can produce more power than the nominal designed output. For example, when the wind speed is low, a lower-power generator may be connected, and when the wind speed is higher, an additional or a higher-power generator may be connected.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

Although the present invention has been illustrated principally in relation to wind generation, it can also be used undersea or in rivers.

It will be clear to one having skill in the art that further variations to the specific details disclosed herein can be made, resulting in other embodiments that are within the scope of the invention disclosed. The embodiments and all parameters, dimensions, proportions and configurations described herein are examples only and actual values of such depend on the specific embodiment. Accordingly, the scope of the invention is to be construed in accordance with the substance defined by the following claims.

The invention claimed is:

1. A system for harnessing energy from wind comprising:
   a track that guides a set of carts in a horizontal looped path;
   a frame on which the track is mounted;
   a circular track on which the frame is rotatably mounted;
   the set of carts, each cart having a rack attached thereto, and at least some of the carts being aerofoil carts each of which carry an aerofoil that moves the aerofoil cart along the track when the wind blows over the aerofoil; and
   a gear at a side of a straight section of the track positioned to be contacted by and driven by the racks on the carts when the carts pass the gear, wherein the gear drives an electrical generator;
   wherein at least some of the carts are locked together in a train on the straight section of the track and others of the carts are unlocked from each other on a curved section of the track.

2. The system of claim 1, comprising a vertical transmission shaft via which the gear drives the electrical generator.

3. The system of claim 1, wherein:
   each cart comprises a plurality of further racks, each further rack positioned to drive a different further gear that drives the electrical generator;
   the gear and further gears are mounted on the frame and located on both sides of the straight section of the track; and
   the frame rotates about a vertical axis.

4. The system of claim 1, comprising a connector which is adjustable between:
   a locked state in which one of said carts is connected to an adjacent cart of said carts; and
   an unlocked state in which said one cart is disconnected from said adjacent cart.

5. The system of claim 1, wherein each aerofoil cart has:
   a further frame with a base;
   a rotatable base mounted on the base, the rotatable base carrying the aerofoil;

a plurality of notches on the rotatable base;
one or more locks that lock the aerofoil in at least two different angular orientations, wherein at least one of the locks engages with the notches; and
support wheels mounted under the base.

6. The system of claim 5, wherein each aerofoil cart has:
a pushrod that operates one of the one or more locks;
a portion of a connector that connects the aerofoil cart to an adjacent cart;
a further pushrod that operates the connector; and
a control pin that rotates the aerofoil;
and the track has:
an elongated shape with a further straight section and a further curved section, the curved sections each being in a different end region of the track;
a pushrod rail that activates the pushrod in each end region;
a further pushrod rail in each end region that activates the further pushrod; and
a channel that guides the control pin.

7. The system of claim 6, wherein the further pushrod rails disconnect the connector before the aerofoil cart and the adjacent cart enter the curved sections.

8. The system of claim 1, comprising:
one or more further tracks mounted on the frame and arranged in a stack above the track; and
a further set of carts, at least some of which are further aerofoil carts, on each of the one or more further tracks, wherein each further set of carts drives the electrical generator.

9. The system of claim 8, wherein attack angles of the aerofoil carts and further aerofoil carts are set differently, depending on which of the one or more further tracks and the track they are on.

10. The system of claim 8, wherein a height of the aerofoils on the aerofoil carts on the track is greater than a height of further aerofoils on the further aerofoil carts on at least one of the further tracks.

11. The system of claim 8, wherein the aerofoil carts and the further aerofoil carts on adjacent tracks move in opposite directions.

12. The system of claim 1, wherein the straight section of the track is aligned along a diameter of the circular track.

13. The system of claim 1, comprising a ground-level generator house in which the electrical generator is located.

14. The system of claim 1, wherein at least some of the carts are buffer carts, each buffer cart being positioned between two aerofoil carts; the system comprising a plurality of guides that retain the aerofoil carts and buffer carts on the track.

15. The system of claim 1, wherein the track comprises one or more guides located to guide a lower portion of the carts and one or more further guides located to guide an upper portion of the carts.

16. A method for harnessing energy from wind comprising:
mounting a track, which guides a set of carts in a horizontal looped path, on a frame;
rotatably mounting the frame on a circular track;
placing the set of carts on the track, each cart having a rack attached thereto and at least some of the carts being aerofoil carts each carrying an aerofoil that moves the aerofoil cart along the track when the wind blows over the aerofoil, wherein at least some of the carts are locked in a train on a straight section of the track and others of the carts are unlocked from each other on a curved section of the track;
rotating a gear at a side of the straight section of the track, the gear positioned to be contacted by and rotated by the racks on the carts when the carts pass the gear; and
driving an electrical generator by the gear.

17. The method of claim 16, comprising adjusting an angle of attack of the aerofoils by rotating the frame about a vertical axis.

18. The method of claim 16, comprising:
rotating the frame about a vertical axis so that the straight section of the track is facing and perpendicular to a direction of the wind;
detecting a speed of at least one of the carts moving on the straight section; and
rotating the frame such that an apparent wind velocity relative to the carts moving on the straight section is perpendicular to motion of said moving carts.

19. The method of claim 16, comprising connecting said some of the carts into the train so that all the carts in the train simultaneously contribute to rotating the gear.

20. The method of claim 16 comprising:
detecting that a speed of the wind is above a threshold; and
rotating the frame so that the wind drives the aerofoil carts more slowly than before said rotating of the frame.

21. An aerofoil cart for harnessing energy from wind comprising:
an aerofoil, wherein the aerofoil cart is configured to move along a track with a horizontal path when the wind blows over the aerofoil; and
a rack configured to contact and drive a gear at a side of a straight section of the track when the aerofoil cart passes the gear;
wherein the aerofoil cart is configured to be locked to two other carts when on the straight section of the track and unlocked from the two other carts on a curved section of the track.

22. The aerofoil cart of claim 21, comprising:
a plurality of further racks, each further rack positioned to drive a different further gear, wherein the gear and further gears are located on both sides of the straight section of the track;
a lock that locks the aerofoil in at least two different angular orientations;
a pushrod that operates the lock, the pushrod activated by a pushrod rail on the track;
a control pin that rotates the aerofoil, the control pin being moved by a channel on the track; and
a portion of a connector that locks the aerofoil cart to one of the two other carts, wherein the connector is activated by a further pushrod rail on the track.

* * * * *